US008725204B2

(12) United States Patent
Manholm et al.

(10) Patent No.: US 8,725,204 B2
(45) Date of Patent: May 13, 2014

(54) VIRTUAL MULTIPLE ANTENNA (VMAT)

(75) Inventors: Lars Manholm, Gothenburg (SE);
Anders Derneryd, Gothenburg (SE);
Sven Petersson, Sävedalen (SE); Oscar Petersson, Sävedalen (SE); Jonas Fridén, Mölndal (SE); Björn Johannisson, Kungsbacka (SE); Fredrik Harrysson, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1475 days.

(21) Appl. No.: 12/097,991

(22) PCT Filed: Dec. 22, 2005

(86) PCT No.: PCT/EP2005/014091
§ 371 (c)(1),
(2), (4) Date: Jun. 18, 2008

(87) PCT Pub. No.: WO2007/071279
PCT Pub. Date: Jun. 28, 2007

(65) Prior Publication Data
US 2008/0318584 A1    Dec. 25, 2008

(51) Int. Cl.
*H04M 1/00*    (2006.01)
(52) U.S. Cl.
USPC ........ 455/556.1; 455/446; 455/557; 455/450; 455/451
(58) Field of Classification Search
USPC ............... 455/446, 556.1, 557, 450, 451, 455/452.1–452.2
See application file for complete search history.

(56) References Cited

U.S. PATENT DOCUMENTS

| | | | |
|---|---|---|---|
| 6,594,351 B1 * | 7/2003 | Bhogal et al. | 379/100.01 |
| 2002/0028655 A1 | 3/2002 | Rosener et al. | |
| 2003/0220074 A1 | 11/2003 | Wee et al. | |
| 2004/0203346 A1 | 10/2004 | Myhre et al. | |
| 2005/0227616 A1 | 10/2005 | Takatani et al. | |
| 2005/0239496 A1 * | 10/2005 | Sylvain | 455/552.1 |
| 2005/0245233 A1 * | 11/2005 | Anderson | 455/411 |
| 2006/0041538 A1 * | 2/2006 | King et al. | 707/3 |

FOREIGN PATENT DOCUMENTS

| | | |
|---|---|---|
| DE | 10027115 A1 | 12/2001 |
| EP | 113592 A | 2/2001 |
| EP | 1545076 A | 6/2003 |

OTHER PUBLICATIONS

Jung Houn Yap et al: "Position assisted relaying and handover in hybrid ad hoc WCDMA cellular system" Personal, Indoor and Mobile Radio Communications, 2002, The 13th IEEE International Symposium on Sep. 15-18, 2002, Piscataway, NJ, USA,IEEE, vol. 5, Sep. 15, 2002, pp. 2194-2198.
Wei H-Y et al: "Two-Hop-Relay Architecture for Next-Generation WWAN/WLAN Integration" IEEE Wireless Communications, IEEE Service Center, Piscataway, NJ, US, vol. 11, No. 2, Apr. 2004, pp. 24-30.

* cited by examiner

*Primary Examiner* — Wayne Cai

(57) ABSTRACT

The present invention relates to a communication unit, network and method for communication within a communication network, the unit comprising a transceiver portion, a processing unit and at least one interface arrangement for communication with at least one peripheral device. The unit further comprises an arrangement for transceiving at least parts of a signal to the communication network using at least one of said interface arrangements for communication with said at least one peripheral device.

23 Claims, 4 Drawing Sheets

VIRTUAL MULTIPLE ANTENNA (VMAT)

TECHNICAL FIELD

The present invention relates to a communication network, method and unit for improving performance of radio communication and in particular to a multi path solution using a plurality of neighbouring communication enabled devices.

BACKGROUND OF THE INVENTION

There is an ever increasing demand for available bandwidth and radio resources in wireless communication. Currently, the wireless communication field is one of the most expansive development and deployment fields within the communication arena. However, wireless communication have several drawbacks and inherent problems that limit the amount of available bandwidth and radio resources since they operate in an open field with competing radio resources, disturbing objects and disturbing environments, and limits to the amount of radio traffic that can be employed at the same time within a given area.

One way of decreasing the effect of disturbing environment may be to use antenna diversity, i.e. essentially two antennas receiving the same signal and in a smart way analysing the signals from these two antennas in order to acquire a large signal to noise ratio (SNR). This demands devices with two (or more antennas) which may increase cost and geometrical size of the devices. Using two or more antennas in one device for transmitting signals it is possible to use different radio channels and therefore potentially increase the available bandwidth for that device; again this increases the cost and size of the device.

SUMMARY OF THE INVENTION

It is an object of the present invention to provide a device, method, and system that may increase transmission and receiving redundancy and/or increase the bandwidth for the device.

This is provided by in a first aspect of the present invention, a communication unit for communication within a communication network, the unit comprising a transceiver portion, a processing unit and one or several interface arrangements for communication with one or several peripheral devices, characterized in that the unit further comprises an arrangement for transceiving at least parts of a signal to the communication network using one or several of the interface arrangements for communication with the one or several peripheral devices.

The communication unit may be a mobile communication unit, such as from the list of a mobile phone, a personal digital assistant (PDA), a mobile computer, and a mobile music platform.

The communication unit may comprise a processing unit, a storage unit, an interface unit, at least one communication portion, a first communication interface, at least one second communication interface, and an identification arrangement.

The processing unit may comprise additional instruction set for handling and processing signals in respect to transmission and reception in the peripheral devices for communicating with the communication network.

The first communication interface may handle a wireless interface used as a main communication link. The second communication interface may be used for communication with peripheral equipment.

The peripheral device may be at least one of a Personal Digital Assistant (PDA), a mobile computer, a printer, a docking station, a battery charging device, storage device, music platform device, telephones, set top boxes for digital audio and/or video, routers or wireless data communication.

The second communication interface may comprise at least one of a wireless interface or wire connection. The wire connection may be one or several of Ethernet, USB, Firewire, optical, serial or parallel connections.

The first and second communication interface may use dissimilar wireless methods.

The communication unit and the peripheral devices may be arranged to act as one unit having several antennas towards said communication network.

Another aspect of the present invention, a communication network is provided comprising:
a communication unit having a communication arrangement for communication with a telecommunication network,
at least one peripheral unit communicatively connectable to the communication unit and having means for communication with the telecommunication network, characterized in that the at least one unit is arranged to mediate a communication signal between the telecommunication network and the communication unit in the communication network.

The telecommunication network is one or several of GSM (Global System for Mobile communication), GPRS (General Packet Radio Service), EDGE (Enhanced Data rates for Global Evolution), UMTS (Universal Mobile Telecommunications System), CDMA (Code Division Multiple Access), CDMA2000 or WCDMA (wideband CDMA).

The at least one transmitter and/or receiver arrangement may control mediation of the signal. The communication unit may control mediation of the signal.

The communication unit and said peripheral units may receive the same type or even the same radio signal. The communication unit and said peripheral units may be perceived as one unit having multiple antennas.

Yet another aspect of the present invention, a device having means for receiving and/or transmitting signals via a wireless interface and a connection arrangement for connection to a mobile communication unit is provided, characterised in that the device comprises a connection portion for connecting the wireless interface to the connection arrangement and further to the mobile communication unit for connecting a signal from the wireless interface to the mobile communication unit.

The device may be at least one of a Personal Digital Assistant (PDA), a mobile computer, a printer, a docking station, a battery charging device, storage device, telephones, set top boxes for digital audio and/or video, routers or wireless data communication.

The second communication arrangement may comprise at least on of an air interface or wire connection. The wire connection is one or several of Ethernet, USB, optical, Firewire, serial or parallel connections.

Still another aspect of the present invention, a method of enhancing one or several of redundancy, bandwidth, capacity, error handling or payload in a communication network is provided, comprising a communication unit for communication with a communication station, and a number of devices having communication ability with the communication centre, the method comprising the steps of:
receiving data by the devices over a radio channel,
providing the data to the communication unit through a communication interface,
processing the data received from the devices and signal from the communication station.

The method may further comprise the steps of:
establishing a communication link with the communication station
either by the communication unit or the communication station determining if an communication quality parameter,
in an optional parallel or subsequent step, determining the quality of an established link and making a decision to open an additional link to the devices connected to the communication unit
connecting to the communication unit the devices,
establishing a communication link between the communication station the devices, and routing data from the communication unit via the plurality of established communication links to the communication station.

These and other aspects of the invention will be apparent from and elucidated with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Basically, the invention emulates a MIMO (Multiple Input Multiple Output) terminal which allows using transmission schemes involving several radio channels, without incorporating several antennas in same device, which will be detailed in the following description of the exemplary embodiments.

Figure 1:
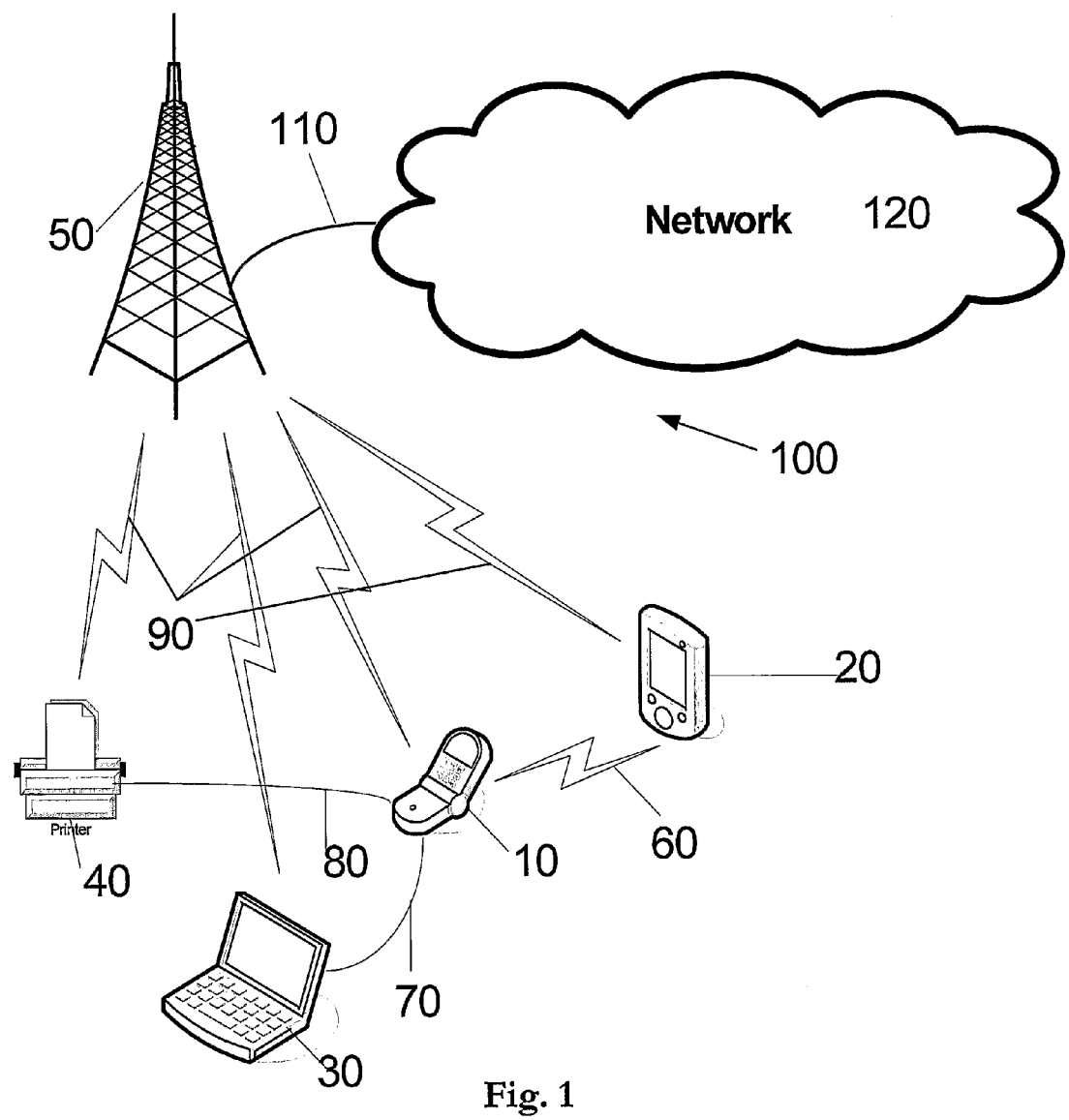
FIG. 1 illustrates a network system according to the present invention.

FIG. 1 illustrates a communication network system 100 according to the present invention including a mobile wireless unit 10, e.g. a mobile phone, a personal digital assistant (PDA), a mobile computer, or a mobile music platform (e.g. an MP3 player), and a number of different peripheral devices such as a personal digital assistant (PDA) 20, a laptop 30, and a printer 40. The network system comprises a central communication device 50 connected to a network 120. The communication device 10 may be connected to a base station 50 or transceiver of the network.

The mobile unit 10 is arranged to communicate with the different peripheral devices 20, 30, and 40 using one or several of different available communication interfaces, for instance a wireless (e.g. Bluetooth) link 60 to the PDA 20, a USB link 70 to the laptop 30, and an Ethernet link 80 to the printer 40. The mobile unit 10 is arranged to mainly establish a wireless communication link 90 with the central communication device 50 (such as a 2G, 2.5G, or 3G base station; "G" stands for generation, i.e. 2G means second generation mobile telephony systems and so on) for transmitting and receiving communication signals to/from the network 120 using any type of suitable link 110 between the central communication device 50 and the network 120. All devices including the mobile unit 10 and the peripheral devices 20, 30, 40 utilize the same communication type towards the central communication device 50 (e.g. a base station).

To employ the teachings of the invention, each peripheral device comprises an air interface for RF communication with the network. The interface may be an internal or external cell phone or the like. In the laptop, for example, a PC-card including a transceiver can be used. The modern PDA's usually also include a cell phone ability and so on. It should be noted that all devices able of communicating wirelessly with the network, must have a unique identity within the local network formed by the mobile unit 10 and the different peripheral devices 20, 30, 40 in a conventional way. However, with respect to the base station 50 all devices should have the same ID so as to provide a single interface towards the base station 50. The base station then believes that it is communicating with a single mobile unit 10 with a plurality of antennas.

In this manner a plurality of radio links 90 and radio channels may be established to the central communication device 50 increasing the available bandwidth and/or providing redundancy using peripheral devices 20, 30 and 40, acting as access converters or access relays. These peripheral devices 20, 30 and 40 may be any type of equipment that can communicate with the mobile unit 10, such as the mentioned PDA, laptop, or printer, but also for instance a docking station, battery charging devices, other mobile units, storage devices, music platform devices (e.g. an MP3 player), telephones, set top boxes for digital audio and/or video, routers, wireless data communication devices (e.g. WLAN, WPAN, and other similar devices).

The mobile unit 10 may communicate with different peripherals using a plurality of communication links, such as IR (infrared), Bluetooth, WLAN (Wireless Local Area Network), e.g. from the IEEE 802.11, 802.15, and 802.16 families, Ethernet, serial or parallel communication, USB (Universal Serial Bus), Firewire (IEEE 1394), or optical communication solutions. However, the communication links between the devices are not limited to the above mentioned types, but any other suitable communication link solution now existing or future developments may be used as understood by the person skilled in the art.

The communication links between the mobile unit 10 and the peripheral devices 20, 30, 40 on one side and the central communication device 50 may be as mentioned earlier using 2G, 2.5G, and 3G, but also future similar wireless communication links. One important aspect of the invention is that the link between the mobile unit 10 and the central communication device 50 is of the same type as between the peripheral devices 20, 30, 40 and the central communication device 50.

With the term 2G is meant GSM (Global System for Mobile communication), CDMA (Code Division Multiple Access), or similar low data rate communication links, with 2.5G is meant any type of intermediate data rate communication link such as GPRS (General Packet Radio Service) and EDGE (Enhanced Data rates for Global Evolution), and with 3G is meant higher data rate communication links such as UMTS (Universal Mobile Telecommunications System), CDMA2000, or WCDMA (wideband CDMA).

Figure 2:
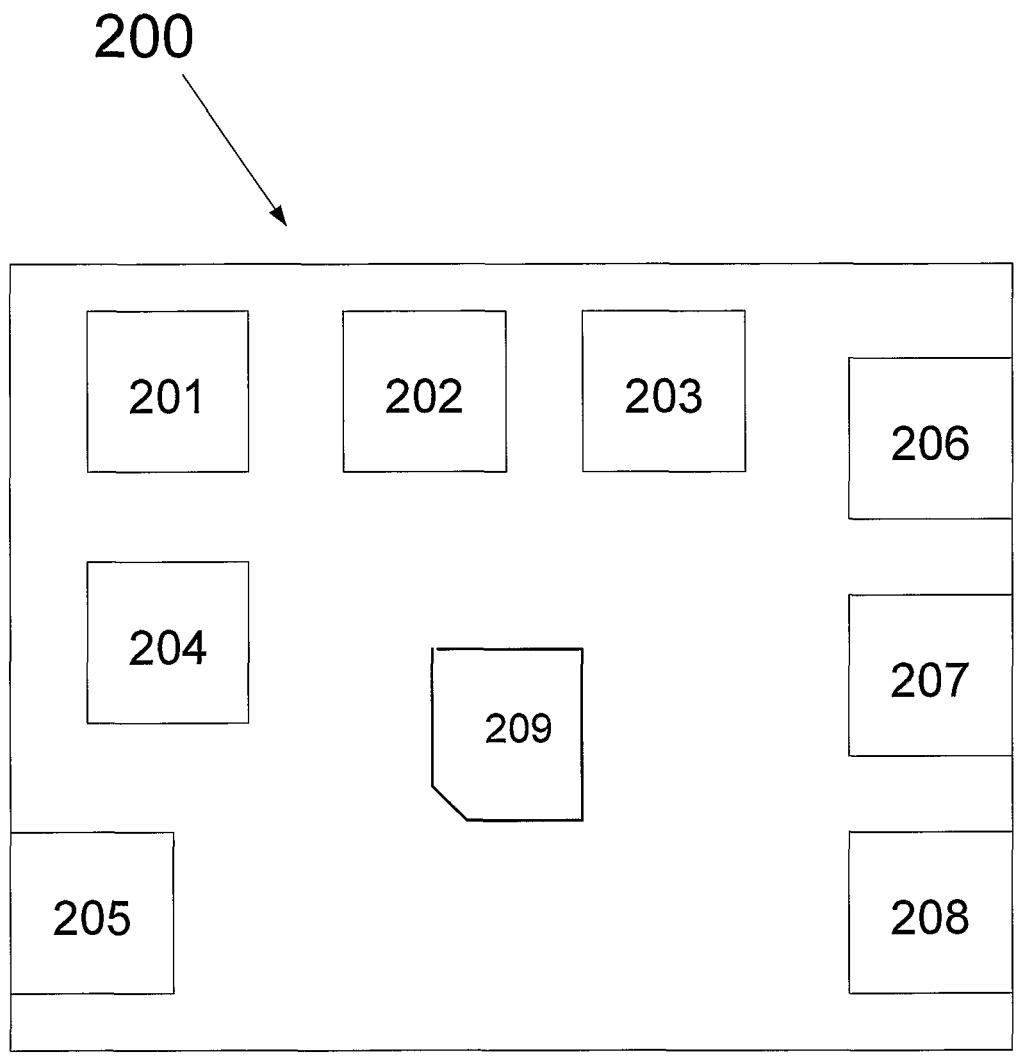
FIG. 2 illustrates a mobile unit according to the present invention.

Turning now to FIG. 2 illustrating a mobile unit 200 according to the present invention comprises a processing unit 201, a storage unit 202, an interface unit 203, at least one communication unit 204, a first communication interface 205 and a plurality of peripheral communication interfaces 206, 207, and 208. The mobile unit further comprises an identification arrangement 209 for uniquely identifying it in the network. The identification arrangement can be a SIM (Subscriber Identity Module) card, IMSI (International Mobile Subscriber Identity), or any other unique identifier. The processing unit 201 has instruction sets for different operations and functions available in the mobile unit, e.g. for interfacing with the user, address and phone register, coding and decoding of voice and/or data, and many other normal operations and functions normally available in mobile units. However, according to the present invention, additional instruction sets for handling and processing the signals incoming from the peripheral devices received and relayed from the communication network are provided. The storage unit 202 may be provided for storing data permanently and/or temporarily, such as an address and phone register, user information and so on. The interface unit 203 may be provided for interfacing with a user via a keypad and an LCD screen or similar. The communication unit 204 may be provided for handling communication related issues such as deciding on which communication interface to use depending on type of data to send or receive (including digital data and voice data). The first communication interface 205 handles a wireless interface used as a main communication link, for instance 2.5G or 3G interface. The peripheral interface units 206, 207, 208 are used for communication with peripheral equipment, as described earlier.

The peripheral equipment may be similarly built with similar components as the mobile unit; however, it should be understood that operations and functions may differ slightly of course depending on type of equipment.

Figure 4:
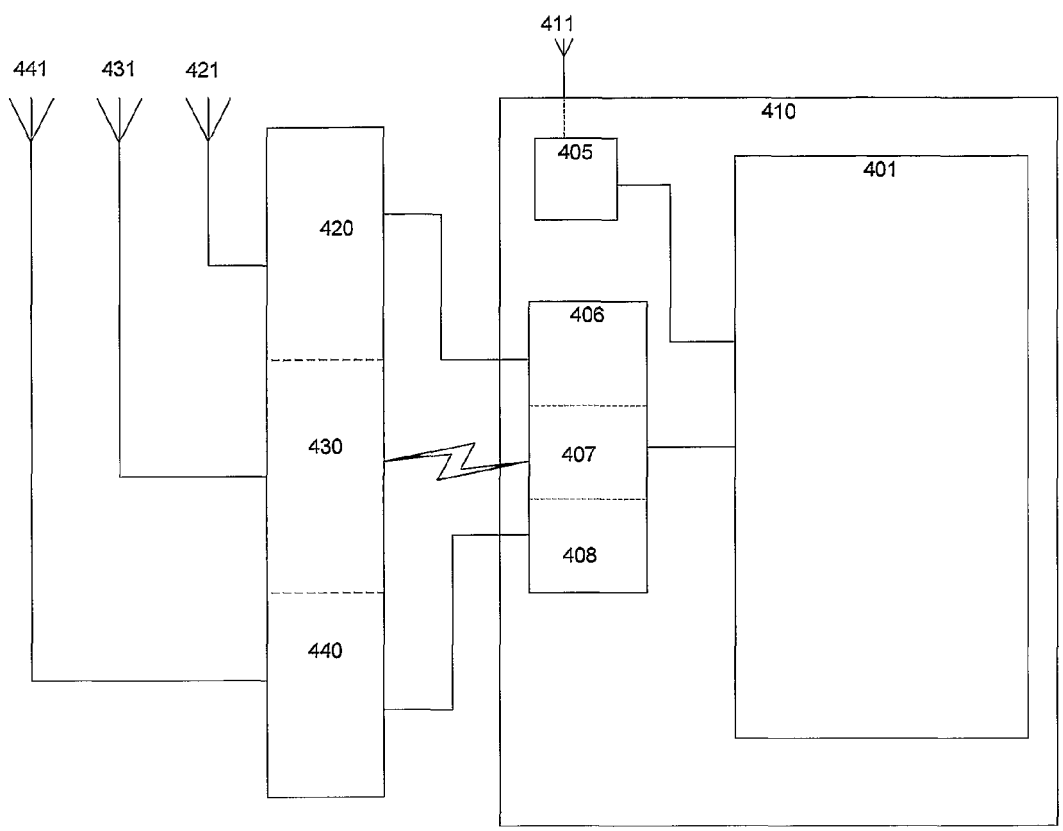
FIG. 4 illustrates schematically a block diagram of a mobile unit according to the invention.

FIG. 4 illustrates a schematic of the reception and transmission of signals by the mobile unit 410. Thus, according to this embodiment, it is assumed that the system of the invention acts as MIMO emulator, in which the peripheral devices act as additional antennas. In this case peripheral are denoted with 420, 430 and 440. Each peripheral device comprises an antenna 421, 431, 441 connected to a transceiver unit (not shown). The mobile station comprises the interfaces 406-408 for communication with peripherals as mentioned earlier. Moreover, the antenna 411 of the mobile unit is connected to the processing unit through the interface 405. The processing arrangement 401 receives the inputs from the interfaces and processes the signals. This is important that the signals are so processed that the information derived from the signals provides correct result.

The peripherals can be tuned into different channels or same channel as the communication unit depending on application and how the components interact. In a first simple application of the present invention, it is utilized as a powerful diversity antenna solution, where a plurality of antennas send the same signal and thus providing e.g. radio signal diversity for handling small scale (microscopic) fading. This is useful for any type of mobile communication solution, including GSM and upwards in the cell phone version history. It is not necessary to demand any changes of the central communication device side (e.g. base station) 50, but the invention may be implemented on the mobile unit 10 side only.

For systems where the essential parts of the system network (i.e. on both mobile unit and base station side) are arranged according to the present invention, it is possible to allow for multiple bit streams transmitted in parallel. The different bit streams are then separated by synchronization codes (embedded into the data packets or signaling packets) that are unique for each bit stream in order to be able to separate the bit streams from each other. The separation is similar as may be found for direct sequence spread spectrum (DSSS) techniques, where orthogonal (or semi-orthogonal) codes are used to separate different data streams from each other. This type of enhanced data streaming is particularly useful for the more recent cell phone infrastructure systems, e.g. 2.5G and 3G systems.

Figure 3:
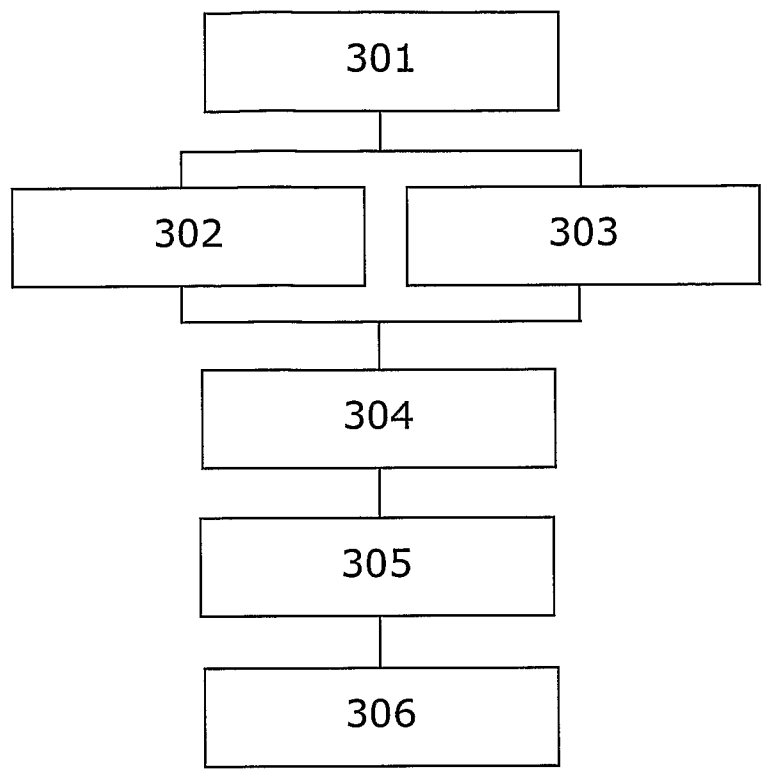
FIG. 3 illustrates schematically a flow diagram of a method according to the present invention.

Turning now to FIG. 3 wherein a flow diagram illustrates steps of a method according to the present invention. In a first step 301, the user establishes a communication link with the base station through the communication device 50 and possibly further up the communication link channel (depending on the type of the communication link) as understood by the person skilled in the art. In step 302, either the mobile unit 10 or the base station (or any other device on the base station side of the communication link) determines if the available communication rate is sufficient or if there is a need for increasing this rate. In an optional parallel or subsequent step 303, the system may determine the quality of the established link (or links) and selects to open additional links or channels to the devices connected to the mobile unit, to provide redundancy, multiple streams, or error handling functions. In step 304, the peripheral units 20, 30, 40 are connected to the mobile unit 10 or already established connections are used and in a subsequent step 305 the mobile unit 10 establishes communication links with the central communication device 50 via each peripheral unit each using a communication link with the central communication device 50 in a similar manner as the mobile unit 10. The mobile unit 10 routes data via the plurality of established communication links (via the direct first link 90 and/or via links 60, 70, 80 to the peripheral units 20, 30, 40). The traffic is routed to or from the mobile unit 10 according to a predetermined traffic shaping function in order to use the peripheral devices 20, 30, 40 in a rate optimal manner, i.e. depending on data rate of established links either between the mobile unit 10 and each peripheral unit 20, 30, 40 and/or between each peripheral unit 20, 30, 40 and the central communication device 50. The mobile unit may also use other parameters in the traffic shaping function, e.g. battery levels of peripheral units, link quality (such as signal to noise levels and/or data rate), type of peripheral unit, type of data, ownership of peripheral units, and so on. In a last step 306, when the communication session is terminated, the communication links not used are terminated.

In a similar manner, the base station 50 may use established links with the mobile unit 10 directly and/or together with peripheral units 20, 30, 40. There may also be provided a traffic shaping function at the base station side of the communication link as described above for the mobile unit using similar types of traffic shaping criteria.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A communication unit for communication within a communication network, the communication unit comprising:
 a transceiver portion;
 at least one interface for communication with at least one peripheral device;
 a second interface for direct communication with the communication network; and a processing unit, further comprising
  an arrangement for transceiving a first part of a signal to the communication network using at least one of said interface arrangements for communication with said at least one peripheral device and for transceiving a second part of the signal to the communication network using the second interface, wherein the transceving of the first part and second parts of the signal are performed in parallel, and
  an arrangement for transceiving signals to the at least one peripheral device in such a way that the at least one peripheral device will transceive signals with the same identifier (ID) as the communication unit in communication with a central communication device.

2. The communication unit according to claim 1, wherein said communication unit is a mobile communication unit.

3. The communication unit according to claim 1, wherein said mobile communication unit is at least one of a mobile phone, a personal digital assistant (PDA), a mobile computer, and a mobile music platform.

4. The communication unit according to claim 1, comprising a processing unit, a storage unit, an interface unit, at least one communication portion, a first communication interface, at least one second communication interface, and an identification arrangement.

5. The communication unit according to claim 4, wherein the processing unit comprises additional instruction set for handling and processing signals with respect to transmission and reception in the peripheral devices for communication with said communication network.

6. The communication unit according to claim 4, wherein said first communication interface handles a wireless interface used as a main communication link.

7. The communication unit according to claim 4, wherein said second communication interface is used for communication with peripheral equipment.

8. The communication unit according to claim 4, wherein said second communication interface comprises at least one of a wireless interface or wire connection.

9. The communication unit according to claim 8, wherein said wire connection is one or several of Ethernet, USB, Firewire/IEEE 1394, optical, serial or parallel connections.

10. The communication unit according to claim 4, wherein said first and second communication interface use dissimilar wireless communication methods.

11. The communication unit according to claim 1, wherein said peripheral device is at least one of a Personal Digital Assistant (PDA), a mobile computer, a printer, a docking station, a battery charging device, storage device, music platform device, telephones, set top boxes for digital audio and/or video, routers or wireless data communication.

12. The communication unit according to claim 1, wherein said communication unit and said peripheral devices are arranged to act as one unit having several antennas towards said communication network.

13. A communication network comprising:
  a mobile communication unit having a communication arrangement for communication with a telecommunication network;
  at least one peripheral device communicatively coupled to said communication unit and having means for communication with said telecommunication network, wherein said at least one peripheral device is arranged to mediate a communication signal between the telecommunication network and said communication unit in said communication network using an identity which is, with respect to a central communication device, identical to the identity of the mobile communication unit, wherein the communication arrangement and the peripheral device arranged to mediate the communication signal communicate with the telecommunication network in parallel.

14. The communication network according to claim 13, wherein said telecommunication network is one or several of GSM (Global System for Mobile communication), GPRS (General Packet Radio Service), EDGE (Enhanced Data rates for Global Evolution), UMTS (Universal Mobile Telecommunications System), CDMA (Code Division Multiple Access), CDMA2000 or WCDMA (wideband CDMA).

15. The communication network according to claim 13, wherein at least one transmitter and/or receiver arrangement controls mediation of said signal.

16. The communication network according to claim 13, wherein said communication unit controls mediation of said signal.

17. The communication network according to claim 13, wherein said communication unit and said peripheral units receive same type of radio signal from said telecommunications network.

18. The communication network according to claim 13, wherein said communication unit and said peripheral units receive same radio signal from said telecommunications network.

19. The communication network according to claim 13, wherein said communication unit and said peripheral units are perceived from said telecommunications network as one unit having multiple antennas.

20. A device, comprising:
  a processing unit for processing signals;
  means for receiving and/or transmitting signals via a wireless interface and a connection arrangement for connection to a mobile communication unit wherein said device comprises a connection portion for coupling said wireless interface to said connection arrangement and further to said mobile communication unit for connecting a signal from said wireless interface to said mobile communication unit and is further arranged to identify itself in the wireless interface using an identity which is, with respect to a central communication device, identical to the identity of the mobile communication unit, wherein the device and the mobile communication unit communicate with the central communication device in parallel.

21. The device according to claim 20, wherein said device is at least one of a Personal Digital Assistant (PDA), a mobile computer, a printer, a docking station, a battery charging device, storage device, telephones, set top boxes for digital audio and/or video, routers or wireless data communication.

22. The device according to claim 20, wherein a second communication arrangement comprises at least one of a wireless interface or wire connection.

23. The device according to claim 22, wherein a wire connection is one or several of Ethernet, USB, optical, Firewire/IEEE 1394, serial or parallel connections.

* * * * *

UNITED STATES PATENT AND TRADEMARK OFFICE
CERTIFICATE OF CORRECTION

PATENT NO. : 8,725,204 B2  
APPLICATION NO. : 12/097991  
DATED : May 13, 2014  
INVENTOR(S) : Manholm et al.

Page 1 of 1

It is certified that error appears in the above-identified patent and that said Letters Patent is hereby corrected as shown below:

In the Specification

In Column 2, Line 53, delete "on" and insert -- one --, therefor.

In the Claims

In Column 7, Lines 7-8, in Claim 1, delete "transceving" and insert -- transceiving --, therefor.

Signed and Sealed this  
Ninth Day of September, 2014

Michelle K. Lee  
*Deputy Director of the United States Patent and Trademark Office*